(12) United States Patent
Daiber et al.

(10) Patent No.: US 6,549,664 B1
(45) Date of Patent: Apr. 15, 2003

(54) SPARSE MODULATION CODES FOR HOLOGRAPHIC DATA STORAGE

(75) Inventors: Andrew J. Daiber, Palo Alto, CA (US); Robert R. McLeod, Morgan Hill, CA (US); Ray Snyder, San Francisco, CA (US)

(73) Assignee: Siros Technologies, Inc., Davis, CA (US)

( * ) Notice: Subject to any disclaimer, the term of this patent is extended or adjusted under 35 U.S.C. 154(b) by 0 days.

(21) Appl. No.: 09/343,933

(22) Filed: Jun. 30, 1999

Related U.S. Application Data

(63) Continuation-in-part of application No. 09/224,031, filed on Dec. 31, 1998, now Pat. No. 6,064,586.

(51) Int. Cl.[7] .................................................. G06K 9/36
(52) U.S. Cl. ............................. 382/232; 359/1; 359/3
(58) Field of Search .............................. 382/237, 232; 365/125; 369/103, 109.01, 110.03; 359/1, 3, 15; 430/1, 290

(56) References Cited

U.S. PATENT DOCUMENTS

| | | | | |
|---|---|---|---|---|
| 4,083,035 A | * | 4/1978 | Riganati et al. | 340/146.3 E |
| 4,516,262 A | * | 5/1985 | Sakurai | 382/18 |
| 5,450,218 A | * | 9/1995 | Heanue et al. | 359/21 |
| 6,414,763 B1 | * | 7/2002 | Hesselink et al. | 359/21 |

* cited by examiner

*Primary Examiner*—Yon J. Couso
(74) *Attorney, Agent, or Firm*—Lumen Intellectual Property Services, Inc.

(57) ABSTRACT

A method for storing data in a holographic storage medium comprises the steps of dividing a bit stream of binary data into data groups, encoding the data groups as binary patterns, and storing the binary patterns holographically as data pages. Each binary pattern comprises channel bits, wherein the number of "off" channel bits is greater than the number of "on" channel bits. To retrieve information from the storage medium, the medium is illuminated and resultant light signals are gathered. The light signals are converted to the binary patterns, and the binary patterns are converted to the data groups. Binary patterns stored in the storage medium only slightly perturb subsequent reading and writing of data, since the patterns have fewer "on" channel bits than "off" channel bits.

16 Claims, 5 Drawing Sheets

SPARSE MODULATION CODES FOR HOLOGRAPHIC DATA STORAGE

CROSS-REFERENCE TO RELATED APPLICATIONS

This application is a continuation-in-part application of U.S. patent application Ser. No. 09/224,031 filed Dec. 31, 1998, U.S. Pat. No. 6,064,586, which is hereby incorporated herein by reference.

GOVERNMENT RIGHTS

The present invention was made with government support under contract No. MDA-972-95-3-004, awarded by the ARPA/NSIC HDSS Consortium. The government has certain rights in this invention.

FIELD OF THE INVENTION

The present invention generally relates to holographic data storage, and more specifically to a method of encoding data for storage within a holographic storage medium.

BACKGROUND

Holographic data storage provides a promising technique for rapid and efficient data storage and retrieval. In holographic data storage systems, binary data is stored in a volume of a holographic storage medium. Holographic storage media contrast with, for example, conventional magnetic disks, where the data is stored on the surface of the storage material.

In a holographic storage system, the signal beam is generally monochromatic, and data is stored by passing a monochromatic signal beam through a spatial light modulator having transparent and opaque pixels representing data comprising a data page. The signal beam is then incident on the holographic storage. A reference beam is also incident upon the storage medium and interferes with the signal beam inside the storage medium. The index of refraction of the storage medium is perturbed by the resulting interference pattern, and a hologram representing a page of data is thereby stored.

The transparent and opaque pixels of the spatial light modulator correspond to "channel bits," the bits that are actually stored in the storage medium. The transparent portions correspond to "on" channel bits, or binary 1's; opaque portions correspond to "off" channel bits, or binary 0's. The channel bits are typically an encoded version of the original binary bits to be stored in the medium.

To retrieve data from a holographic storage medium, the reference beam is incident upon the storage medium. The reference beam is partially diffracted by the perturbations in the index of refraction that correspond to the stored data. The diffracted portion of the reference beam is the image beam, which carries a holographic image of the data page stored.

More than one page of data may be holographically stored in the same volume of a holographic storage medium using well known multiplexing techniques. These techniques include angle multiplexing, where the reference beam has a different angle of incidence upon the storage medium for each page, and wavelength multiplexing, where the reference beam has a different wavelength for each page.

A primary difficulty with holographic storage systems is that the reading and writing signal-to-noise ratios worsen as the amount of data stored in the storage medium increases. A poor signal-to-noise ratio during reading results from the fact that the address beam or the image beam, or both, pass through regions of the storage medium where data that is not being accessed has been stored. These regions alter the signal beam or the address beam, or both.

A similar problem occurs during writing. After an initial amount of data is stored, future data storage requires that the signal beam passes through regions of the storage medium that already contain data. The signal beam is thereby partially scattered, resulting in a poor signal-to-noise ratio for writing data. The reference beam may also be perturbed by previously stored data during the writing process.

The more "on" channel bits that are stored in the storage medium, the worse the signal-to-noise ratios become, since it is the "on" channel bits that cause the unwanted dispersion of the light beams. Generally, a large number of "on" channel bits are usually stored in the storage medium. For balanced selection of channel bits, half of the channel bits are on, and half are off.

One solution to the problem is for the channel bits to contain an encoded version of the original binary data to be stored, wherein the code is selected to improve the signal-to-noise ratios. U.S. Pat. No. 5,450,218 by Heanue et al. discloses a method of encoding data that involves storing reference pixels as well as data pixels in the holographic medium. The data is then read by taking the difference between the signals generated from the reference and data pixels.

U.S. Pat. No. 5,510,912 by Blaum et al. and U.S. Pat. No. 5,727,226 by Blaum et al. disclose methods for modulating data so that "on" channel bits and "off" channel bits are distributed approximately uniformly throughout the page. Finally, U.S. Pat. No. 5,808,998 by Curtis et al. gives a method for encoding data that reduces the length of runs of same-state channel bits.

However, in all of these methods the number of "on" channel bits is still approximately equal to the number of "off" channel bits, so the problem of unwanted scattering of radiation beams during data storage and retrieval is not mitigated.

SUMMARY

Briefly and in general terms, the present invention provides a system and method for holographic data storage and retrieval having improved signal-to-noise ratios. With the present invention, digital data pages comprise sparse modulation codes, which have a smaller number of "on" channel bits than "off" channel bits on average.

In a presently preferred embodiment, by way of example and not necessarily by way of limitation, sparse modulation encoding for data storage is accomplished by dividing a bit stream of binary data into data groups, encoding these data groups as binary patterns, and storing the binary patterns as data pages in a holographic data storage medium. Each binary pattern comprises "on" channel bits and "off" channel bits. Generally, "on" channel bits are recorded when a recording signal originating from a signal beam is present, and "off" channel bits are recorded when the recording signal representing that bit is absent. Upon data retrieval, the binary patterns are converted to the data groups using lookup tables or conversion algorithms. Channel bits are represented by pixels of a page, and a number of pages are multiplexed in a single volume of the storage medium.

Generally, accumulated light exposure, or accumulated index of refraction perturbation, or both, due to recorded "on" channel bits decreases the signal-to-noise ratios for reading and writing data. For a system with a given dynamic range available for signal index perturbation, sparse modulation codes can reduce the accumulated light exposure, or the accumulated noise index of refraction perturbation, or both, thereby increasing the signal-to-noise ratios. For a given signal-to-noise ratio, the storage capacity of the storage medium is in general increased by the sparse modulation codes.

In one embodiment of the present invention, a lookup table is used to relate the data groups to the binary patterns. The $k^{th}$ binary pattern comprises $n_k$ channel bits, $m_k$ of which are "on". The $k^{th}$ data group comprises $b_k$ bits, and to ensure that the $k^{th}$ binary pattern contains at least as much information as the $k^{th}$ data group, $n_k$-choose-$m_k \geq 2^{b_k}$. A sparseness is defined as the average ratio of $n_k/m_k$. In the present modulation codes, the sparseness is greater than 2. In some embodiments, standard error-correction encoding and data interleaving techniques are used to process the binary data before it is modulation encoded.

To retrieve data that has been stored holographically, an address beam illuminates the storage medium. The address beam causes an image beam to emerge from the storage medium. Light signals from the image beam are detected. These detected signals are processed if necessary, and stored as a data array. Data sectors comprising a plurality of array elements are identified; the $k^{th}$ data sector has $n_k$ array elements and corresponds to the $k^{th}$ binary pattern. In the preferred embodiment, the $m_k$ largest array elements of the $k^{th}$ data sector are identified as "on" channel bits, and the remaining $n_k-m_k$ array element values are identified as "off" channel bits; the $k^{th}$ binary pattern is thereby recovered. Once the data sectors are converted to binary patterns, the binary patterns are converted to data groups of binary information.

Frequently, a diffraction efficiency of a holographic storage medium varies inversely with the square of the number of pages multiplexed. For such storage media, by example, sparse coding results in an increase in the number of pages that can be recorded. Sparse modulation codes can be chosen to have a sparseness that maximizes the storage capacity of these storage media.

DETAILED DESCRIPTION

I. Data Storage

A method and apparatus for holographic storage of binary data is described. In the preferred embodiment, the binary data is first processed using known techniques. The binary data is divided into data bytes, then additional error correction code bytes are added. A typical error correction code is the Solomon-Reed code. The result of the error correction encoding is a stream of code words, each code word comprising data bytes and error correction code bytes. Typically, each code word comprises 15 bytes total; however, any number of bytes is possible.

The bytes are then shuffled, or reordered, to make a new sequence of bytes. The bytes belonging to a given codeword are nonadjacent in the new sequence. This reordering reduces errors in data storage and retrieval since if errors are generated in a string of consecutively stored bytes, that string is not likely to contain any code word in its entirety. The defective string is more likely to contain portions of a number of code words, due to the reordering. Errors produced in these portions can generally be corrected using the error correction code.

Figure 1:
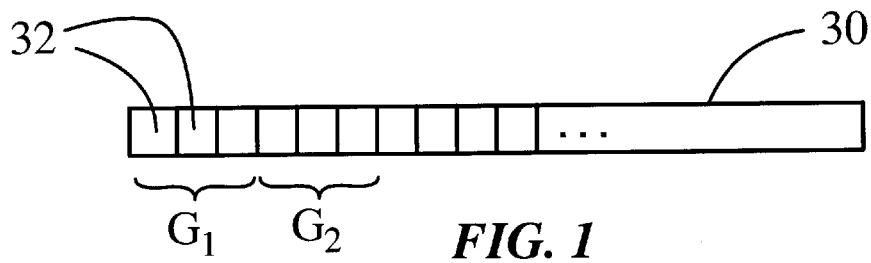
FIG. 1 shows a bit stream to be stored.

FIG. 1 illustrates a bit stream 30 comprising bits 32 that are to be stored. In a preferred embodiment, bits 32 belong to bytes that have been error correction encoded and reordered as outlined above; in general, however, bit stream 30 is any desired stream of binary data.

Bit stream 30 is divided into a series of N data groups $G_1$, $G_2$, ... $G_N$. The $k^{th}$ data group $G_k$ comprises $b_k$ bits. In some embodiments, all of the data groups have the same number of bits; that is, $b_k=b$ for $1 \leq k \leq N$, where b is an integer number. However, in general different data groups have different numbers of bits.

FIG. 1 depicts an example where b=3. Hence data groups $G_1$ and $G_2$, illustrated in FIG. 1, each comprise three bits. In general, b is any desired number.

Figure 2:
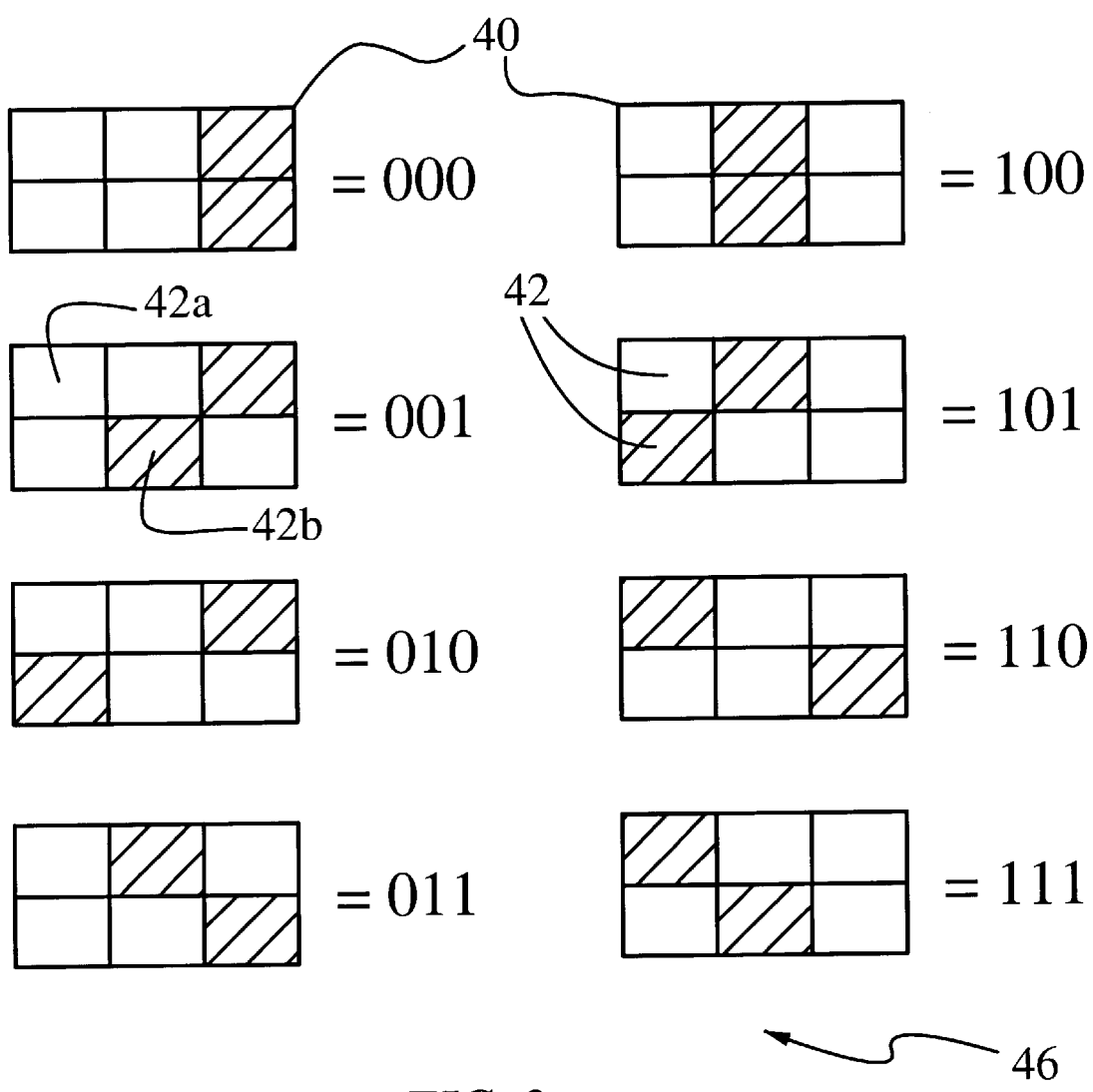
FIG. 2 shows an example of a lookup table for relating data groups to binary patterns.

Once bit stream 30 is divided into the data groups, the data groups are converted into binary patterns 40, as illustrated in FIG. 2. Binary patterns 40 comprise channel bits 42. The term "channel bits" is used to distinguish the components of binary patterns 40 from bits 32. Binary patterns 40 are arrangements of "off" channel bits 42a and "on" channel bits 42b. In some embodiments, the data groups are converted into the binary patterns 40 using a lookup table 46, as illustrated in FIG. 2. Lookup table 46 comprises a list of data groups and a list of binary patterns 40; lookup table 46 serves as a dictionary to translate the data groups into binary patterns 40. In the example of FIG. 2, lookup table 46 correlates three-bit data groups to binary patterns 40 having two "on" channel bits 42b and four "off" channel bits 42a. The process of converting bits 32 to binary patterns 40 is referred to as "modulation encoding" the bits. The equivalence between the binary patterns and the data groups, as exemplified by FIG. 2, is called a "modulation code."

The association of the data groups to the binary patterns is arbitrary, and FIG. 2 shows only one possibility. The important point about the conversion of the data groups to the binary patterns is that each binary pattern has fewer "on" channel bits than "off" channel bits.

In general, the $k^{th}$ data group $G_k$ is converted into a $k^{th}$ binary pattern having $n_k$ channel bits. The $k^{th}$ binary pattern has $m_k$ "on" channel bits and $n_k-m_k$ "off" channel bits, where $m_k < n_k/2$ and $n_k > 2$. There are $n_k$-choose-$m_k$ different ways to arrange $m_k$ "on" channel bits in a pattern of $n_k$ channel bits, where $$n_k\text{-choose-m}_k = \binom{n_k}{m_k} = \frac{n_k!}{m_k!(n_k-m_k)!}.$$

Since data group $G_k$ has $b_k$ bits, $n_k$ and $m_k$ must satisfy the condition $n_k$-choose-$m_k \geq 2^{b_k}$. This condition ensures that the $k^{th}$ binary pattern contains at least as much information as the $k^{th}$ data group $G_k$.

In some embodiments, $b_k=b$ for each of the data groups, and $n_k=n$ and $m_k=m$ for each of the binary patterns. In other words, in these embodiments, all of the binary patterns have the same number of "on" channel bits and the same number of "off" channel bits. In one embodiment, for example, n=8 and m=3. However, in other embodiments the binary patterns have various numbers of "on" channel bits and "off" channel bits.

Figure 3:
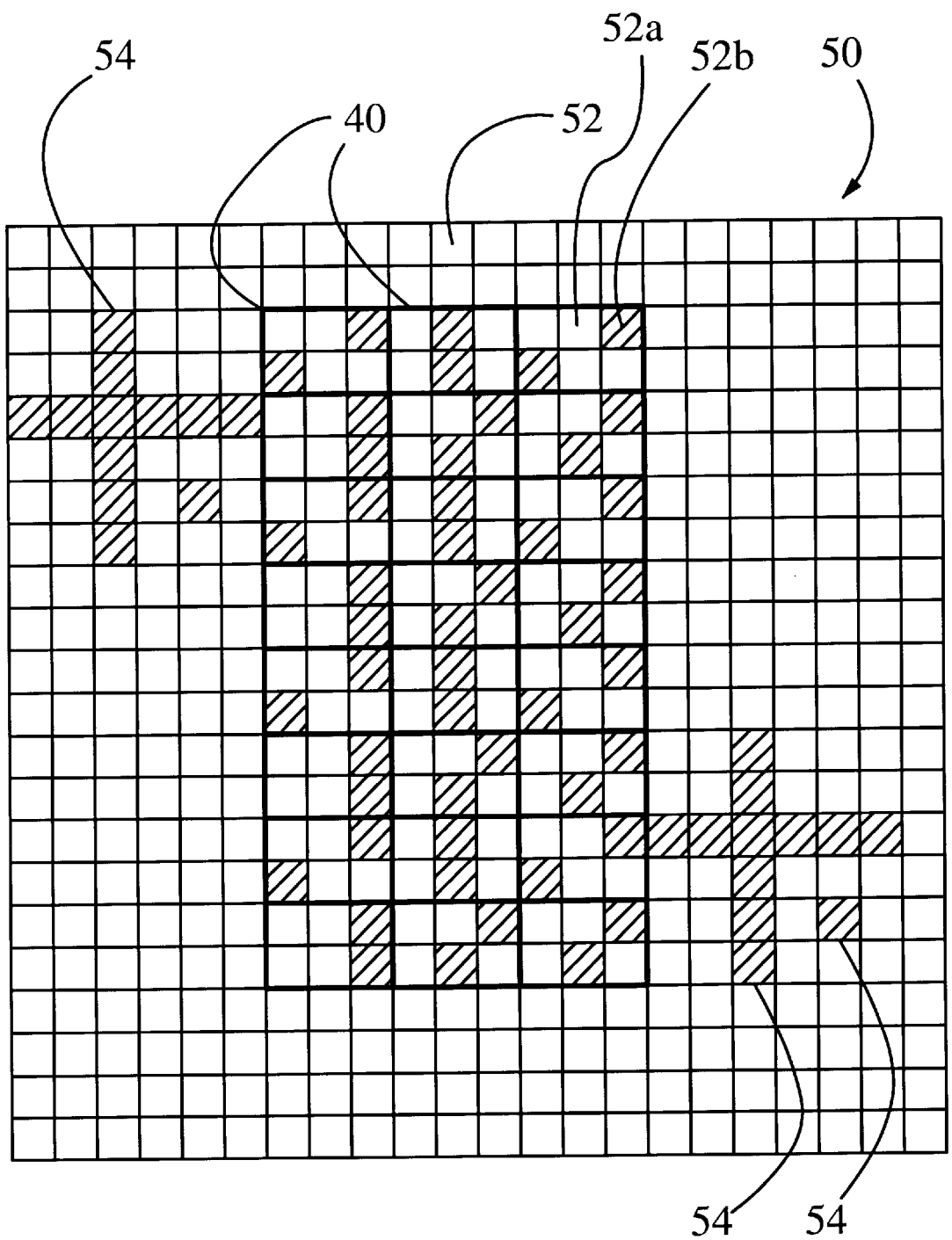
FIG. 3 shows an example of a page comprising binary patterns to be stored holographically.

Binary patterns 40 are formatted onto a page 50, as shown in FIG. 3. Page 50 comprises page pixels 52. Binary patterns 40 are formed as arrangements of opaque page pixels 52a representing "off" channel bits, and transparent page pixels 52b representing "on" channel bits. Page 50 may also comprise reference marks 54, which can be used, for example, for alignment or diagnostic purposes during the readout of the data. Reference marks 54 comprise any desired arrangements of opaque and transparent page pixels. Although page 50 as shown in FIG. 3 has 484 page pixels 52, in the preferred embodiment page 50 has approximately one million page pixels 52. The figures, therefore, are purely schematic.

Figure 4:
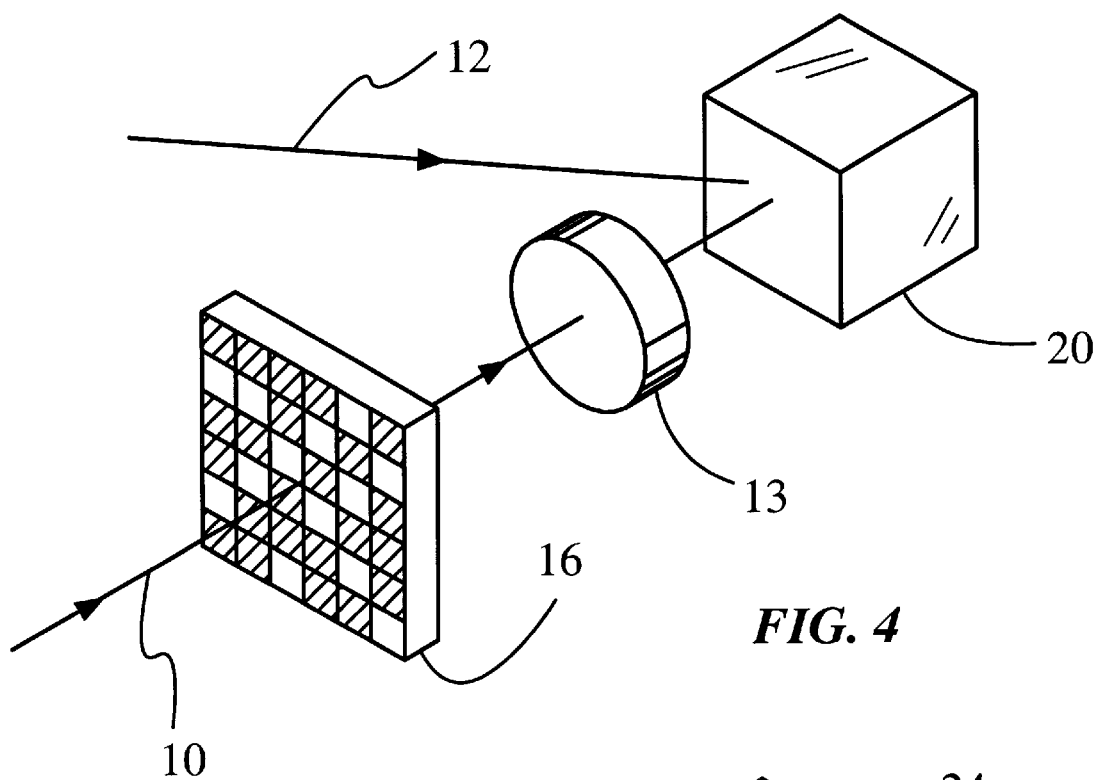
FIG. 4 shows an apparatus for holographically storing a data page.

In one embodiment of the present invention, page 50 is displayed on a spatial light modulator 16, as shown in FIG. 4. A signal beam 10, generated by a monochromatic light source (not shown), passes through spatial light modulator 16. Signal beam 10 subsequently strikes a holographic storage medium 20. A reference beam 12 is also incident upon storage medium 20. Standard optical components 13, such as lenses, are used to deliver signal beam 10 to storage medium 20. An interference pattern between signal beam 10 and reference beam 12 is stored in storage medium 20 according to known principles. In regions of constructive interference, the index of refraction of storage medium 20 is changed. Page 50 is thereby stored as a hologram. Using the above technique, a number of pages are stored in the same storage medium 20 by known multiplexing methods.

II. Data Retrieval

Figure 5:
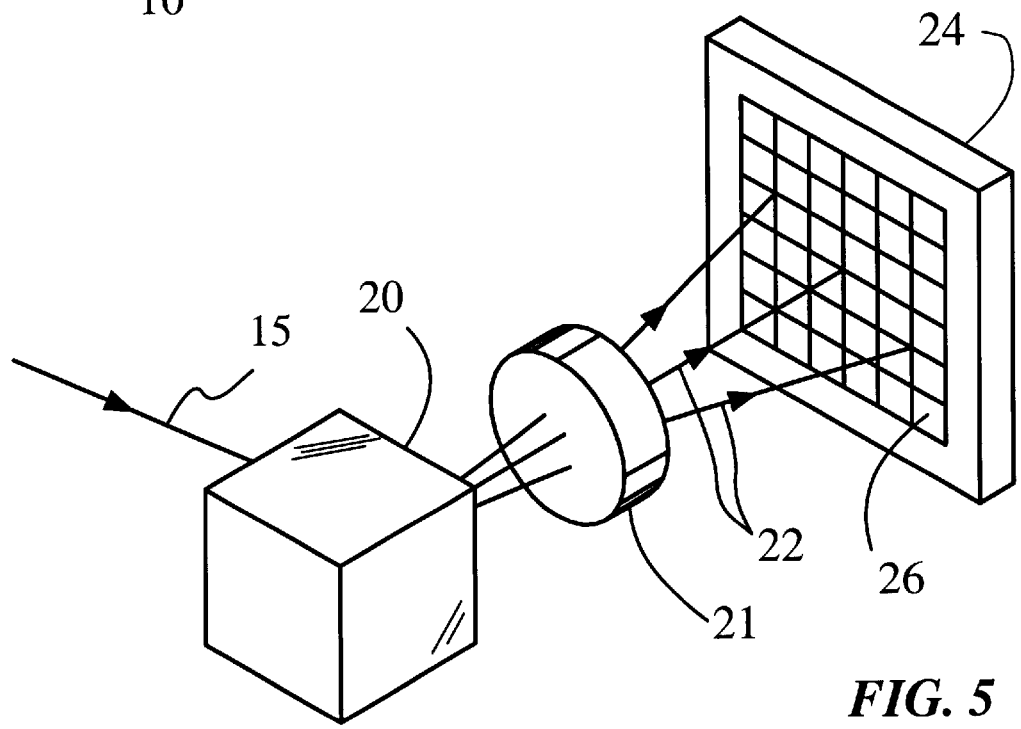
FIG. 5 shows an apparatus for retrieving a holographically stored page.

A system for holographic readout of data pages is shown in FIG. 5. An address beam 15 is incident upon storage medium 20, causing an image beam 22 to be emitted. Address beam 15 is identical to reference beam 12 in the embodiments of FIGS. 4 and 5. Image beam 22 is incident upon a detector 24. An image of page 50 stored in storage medium 20 is thereby projected onto detector 24. Standard optical components 21, such as lenses, deliver image beam 22 to detector 24. Detector 24 has detector pixels 26, and is preferably a CCD detector.

Each detector pixel 26 produces an electrical signal proportional to a light intensity received from image beam 22. That is, detector 24 converts light signals to electrical signals. The electrical signals are used to form a data array 60, diagrammed in FIG. 6, that is stored in a standard electronic memory (not shown). Data array 60 comprises array elements 62 that correspond to page pixels 52 of page 50. In the simplest embodiment, each one of the detector pixels 26 receives an image of one of the page pixels 52, and the values of array elements 62 are proportional to the light signals received by the detector pixels 26.

In another embodiment, each detector pixel 26 is one fourth the size of an image of one page pixel 52. In this embodiment, each array element is an average of electrical signals received from four detector pixels. In still other embodiments, the electrical signals from detector pixels 26 are processed and then stored as data array 60. Such processing may include, for example, a correction for a misalignment between detector 24 and image beam 22, or corrections for aberrations caused by optical components 13 and 21. Several such techniques for processing are known in the art; see, for example, U.S. Pat. No. 5,511,058 by Visel et al., "Distortion Correction of a Reconstructed Holographic Data Image." Other techniques are disclosed in co-pending U.S. patent application "Method for Holographic Data Storage and Retrieval" by Ray Snyder and Andrew Daiber. The processing may carried out using digital electronics.

Figure 6:
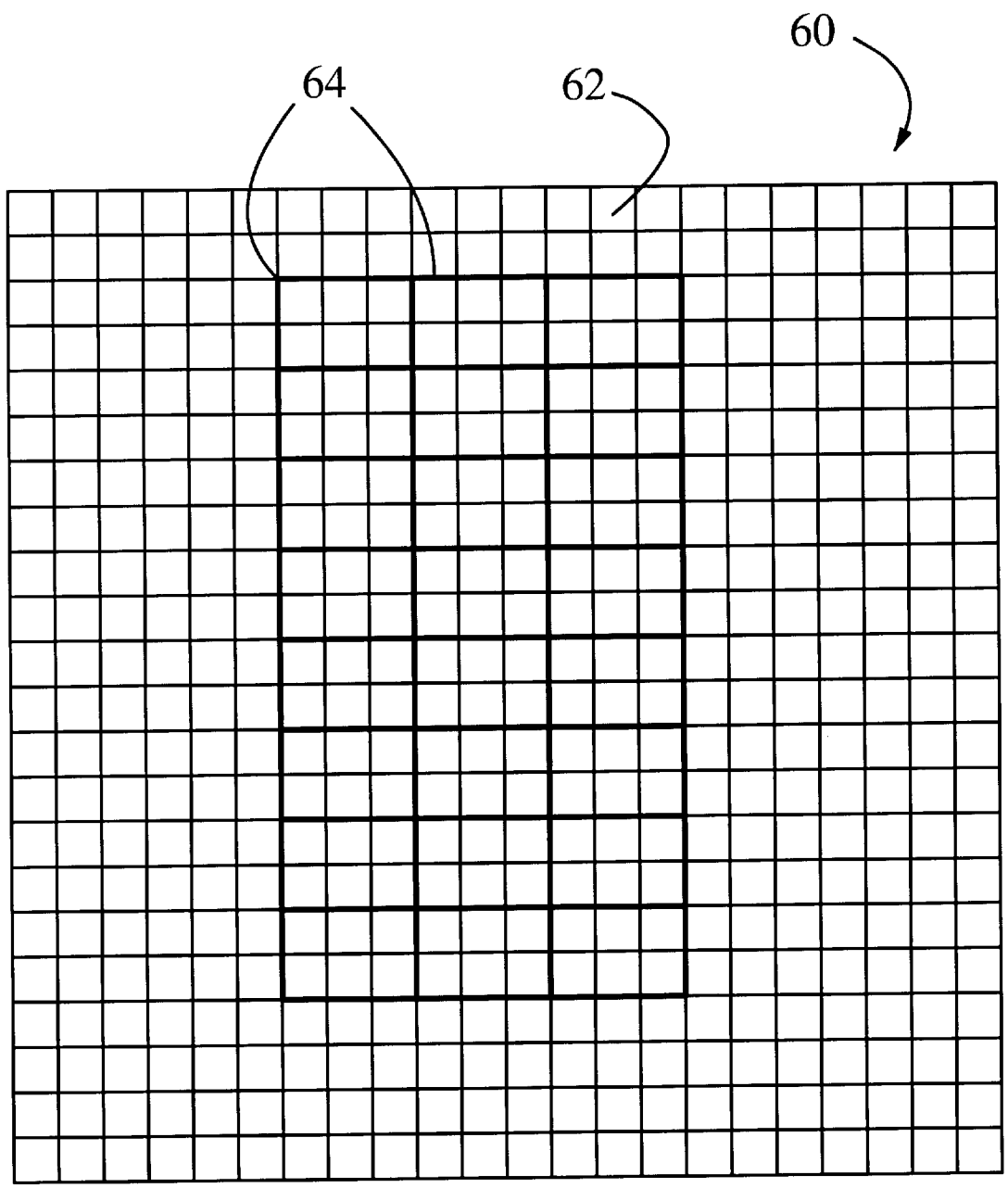
FIG. 6 is a schematic of a data array of signals corresponding to the stored page.

Electrical signals from detector pixels 26 are used to produce data array 60, wherein the value of each array element 62 corresponds to a light signal generated by a page pixel 52 stored in storage medium 20. Locations of N data sectors 64 are identified within data array 60, as shown in FIG. 6, the $k^{th}$ data sector comprising $n_k$ array elements 62. Each data sector 64 corresponds to one of the binary patterns 40. Locating the data sectors is simplified in some embodiments by first locating array elements that correspond to reference marks 54 of page 50; see FIG. 3. Since binary patterns 40 occur at known distances from reference marks 54 on page 50, data sectors 64 in data array 60 occur at known locations with respect to detected images of reference marks 54.

Each data sector 64 is converted to a binary pattern 40 as follows. The $k^{th}$ data sector comprises $n_k$ array elements. The $m_k$ largest values of these $n_k$ elements are identified as "on" channel bits; the remaining $n_k-m_k$ values are identified as "off" channel bits. The $k^{th}$ data sector is thereby converted into the $k^{th}$ binary pattern.

Typically the array elements detect gray scale intensity, meaning that they take on a range of values, for example between 1 and 100. Using the above technique of identifying the $m_k$ largest array element values of the $k^{th}$ data sector as binary 1's, and the remaining $n_k-m_k$ values as binary 0's, the gray code is converted into the binary patterns.

Binary patterns 40 are then converted into bits 32 by reversing the original technique of modulation encoding the data. Lookup table 46 is used to associate data groups $G_1 \ldots G_N$ to the N binary patterns 40; see FIG. 2. If necessary, the data groups are then reordered, or unshuffled, and error-correction decoded. A plurality of pages may be read from storage medium 20 in this way.

In the preferred embodiment, a plurality of pages are stored in storage medium 20, each page comprising binary patterns 40. Because binary patterns 40 comprise fewer "on" channel bits than "off" channel bits, pages previously stored in storage medium 20 do not greatly affect signal beam 10 as page 50 is stored. Similarly, during data readout, pages not being accessed by address beam 15 minimally perturb image beam 22 in storage medium 20.

In general, bits 32 are stored by first forming data groups $G_1 \ldots G_N$ from bits 32, converting the data groups to the binary patterns, and storing the binary patterns in storage medium 20 as perturbations in an optical property of the storage medium.

To retrieve data recorded as pages in storage medium 20, address beam 15 is incident upon the storage medium. Light signals are induced by address beam 15 and are detected. The detected signals are used to from data array 60 comprising data sectors 64. The data sectors are converted to the binary patterns, and the binary patterns are converted into bits 32.

In FIG. 2, lookup table 46 is used to associate binary patterns 40 to the data groups $G_k$. Lookup table 46 has $2^{b_k}$ entries, where $b_k$ is the largest integer that satisfies $2^{b_k} \leq n_k$-choose-$m_k$. Therefore, a number of possible binary patterns are unused. The number of unused binary patterns U is given by: $U = n_k\text{-choose-}m_k - 2^{b_k}$. These unused binary patterns constitute a waste of possible data storage space.

In one embodiment, the unused binary patterns are used advantageously for error detection. If one data sector 64 is converted into a binary pattern that does not appear on lookup table 46, an error has been detected in that data sector.

In another embodiment, it is desired to waste as little data storage space as possible, and so to reduce the number of unused binary patterns U to zero. This reduction can be achieved by using a finite state machine to convert the data groups to the binary patterns and vice versa. In essence, the finite state machine uses a different lookup table for each data group. A $k^{th}$ lookup table is used to convert the $k^{th}$ data group to the $k^{th}$ binary pattern. The structure of the $k^{th}$ lookup table depends on the value of the $(k-1)^{th}$ data group $G_{k-1}$.

The modulation codes discussed above are called "sparse" because they have more "off" channel bits than "on" channel bits. A pattern sparseness $s_k$ is defined as $n_k/m_k$. Pattern sparseness $s_k$ is the ratio of the total number of channel bits to the number of "on" channel bits of the $k^{th}$ binary pattern. In the present method and system, $s_k \geq 2$ for every k. A sparseness s is defined as the average pattern sparseness:

$$s = \frac{1}{N} \sum_{k=1}^{N} s_k$$

In one embodiment, all of the binary patterns comprise n channel bits; that is, $n_k = n$ for all k. In this embodiment, a desired sparseness s can be achieved by allowing $m_k$ to vary with k. As an example, consider an embodiment where n=8. If $m_k=4$ for all k, s=2. If $m_k=3$ for all k, s=2.66. To achieve an s=2.44, two thirds of the binary patterns have $m_k=3$, and one third of the binary patterns have $m_k=4$.

In another embodiment, $m_k=m$ for all k, and a desired sparseness s is achieved by allowing $n_k$ to vary with k.

III. Optimum Modulation Codes

In the present sparse modulation codes, s>2. Because s>2, the pages not being accessed by address beam 15 interfere less with image beam 22 than would pages without sparse modulation coding. However, as s increases, less data may be stored per page, and therefore more pages must be stored in storage medium 20. This tradeoff is examined below.

In the following discussion, an embodiment where $m_k=m$ for all k is assumed. That is, it is assumed that all of the binary patterns have the same number of "on" channel bits. A code rate r is defined as the number of bits 32 stored per page pixel, and has an upper bound $r_{max}$ given by $$r_{max} = \frac{1}{sm} \log_2 \binom{sm}{m} \quad (1)$$

In the foregoing embodiments using a lookup table, the code rate r is equal to the integer portion of $r_{max}$. In these embodiments, $r = \text{floor}[r_{max}]$, where the floor function returns the largest integer that is less than or equal to $r_{max}$. In other embodiments using a finite state machine to convert between the data groups and the binary patterns, the code rate r approaches $r_{max}$, and is some of these embodiments, $r = r_{max}$.

A transfer rate T is the rate at which data is transferred to and from the storage medium. There are P page pixels per page stored in storage medium 20, and detector 24 receives image beam 22 for an amount of time t. The transfer rate T is therefore equal to:

$$T = \frac{rP}{t} \quad (2)$$

If the transfer rate T is held constant for different code rates r, then time t is proportional to r:

$$t \, r \quad (3)$$

A storage capacity C is the total amount of information that can be stored in storage medium 20. If M pages can be stored in storage medium 20, C=r P M. Therefore:

$$M \propto \frac{C}{r} \quad (4)$$

A diffraction efficiency $\eta_{diff}$ is defined as the intensity of image beam 22 divided by the intensity of address beam 15 during data readout. For many materials, the diffraction efficiency varies inversely with the square of the number of pages stored in storage medium 20:

$$\eta_{diff} \propto \frac{1}{M^2} \quad (5)$$

Eq. (5) holds, for example, when storage medium 20 is a photorefractive material, since a given data recording event partially erases data previously recorded. Eq. (5) also holds when storage medium 20 is a photopolymer, since the dynamic range of the photopolymer must be budgeted among the pages. Substituting Eq. (4) in Eq. (5), $$\eta_{diff} \propto \left(\frac{r}{C}\right)^2 \quad (6)$$

Assuming that a certain threshold number of photons is needed for detector 24 to register an "on" channel bit, the number of photons per "on" channel bit that reach detector 24 is equal to a constant for different code rates:

$$const = \frac{\eta_{diff}}{P/s} t \propto \frac{(r/C)^2}{1/s} r \quad (7)$$

where Eqs. (6) and (3) have been used in the last step. Solving Eq.(7) for storage capacity C, $$C = K r^{3/2} s^{1/2} \quad (8)$$

where K is a constant. To evaluate K, the maximum possible value of C is defined as one. This maximum occurs when r=1 and s=2. Therefore $K = 1/\sqrt{2}$, and $$C = \frac{1}{\sqrt{2}} r^{3/2} s^{1/2} \quad (9)$$

Eq. (9) shows how storage capacity C depends on the code rate r and the sparseness s of a desired modulation code.

In the embodiments with $r = r_{max}$, Eq. (9) expresses, in conjunction with Eq. (1), how the storage capacity C varies with the number of "on" channel bits per binary pattern, m, and the sparseness s. The storage capacity resulting from Eq.

Figure 7:
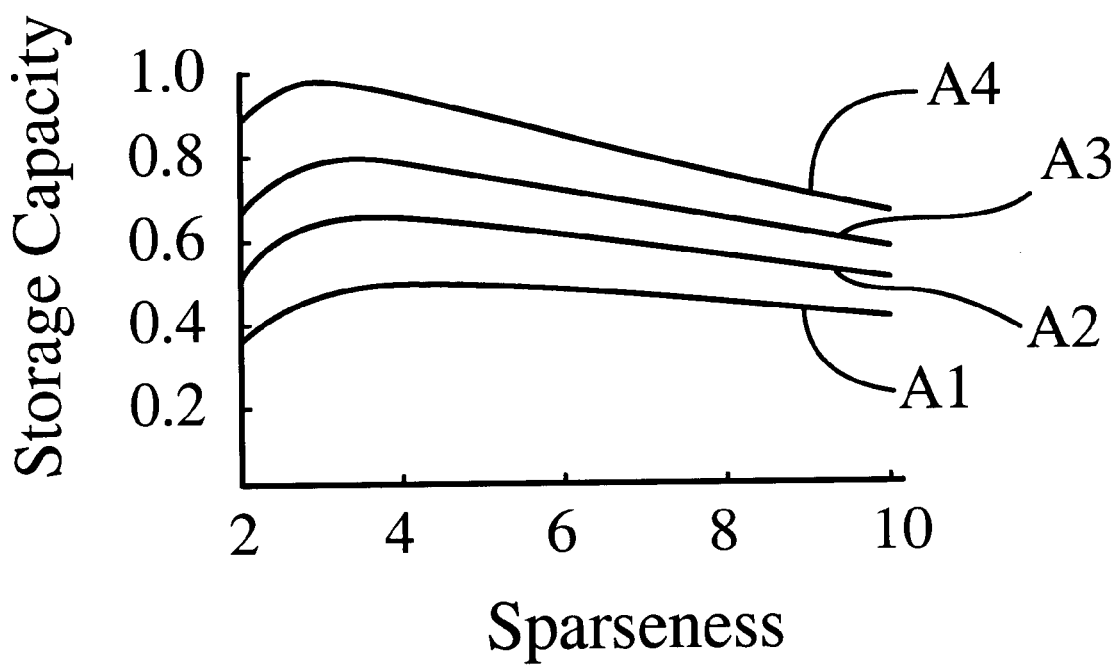
FIG. 7 is a graph of a storage capacity versus a sparseness for four different values a number of "on" channel bits per binary pattern.

(9) and $r=r_{max}$ is shown in FIG. 7 for several values of m. A first curve A1 gives C as a function of s for m=1. Curves A2, A3, and A4 give the storage capacity for m=2, m=4, and m=20, respectively.

It is preferred to maximize the storage capacity. As can be seen from FIG. 7, the maximum storage capacity is obtained for s≈4 when m=1, and as m grows larger, the storage capacity maximum shifts toward s≈3.

To be more precise, the values of s that maximize C when $r=r_{max}$ are given in Table 1 for values of m from 1 to 10. As m tends toward infinity, the optimal value of s approaches 2.85. As described earlier, a desired value of s may be achieved for a given value of m by allowing $n_k$ to vary with k.

TABLE 1

| | |
|---|---|
| m = 1 | s = 4.48 |
| m = 2 | s = 3.81 |
| m = 3 | s = 3.55 |
| m = 4 | s = 3.42 |
| m = 5 | s = 3.33 |
| m = 6 | s = 3.27 |
| m = 7 | s = 3.22 |
| m = 8 | s = 3.18 |
| m = 9 | s = 3.15 |
| m = 10 | s = 3.13 |
| m → ∞ | s → 2.85 |

In some embodiments, a lookup table such as lookup table 46 is used to convert between the data groups and the binary patterns. In these embodiments, $r=floor[r_{max}]$. Eq. (9) can then be used again to determine the storage capacity as a function of m and s, and to find the value of s that optimizes C for different values of m. The resulting optimum sparsenesses are shown in Table 2 for m=1 to 10. For values of m greater than 10, the storage capacity is maximized when s=3, with the exception of m=13, for which the maximum storage capacity occurs at s=4.

TABLE 2

| | |
|---|---|
| m = 1 | s = 4 |
| m = 2 | s = 6 |
| m = 3 | s = 3 |
| m = 4 | s = 5 |
| m = 5 | s = 3 |
| m = 6 | s = 4 |
| m = 7 | s = 4 |
| m = 8 | s = 3 |
| m = 9 | s = 3 |
| m = 10 | s = 3 |
| m → ∞ | s → 3 |

In the preferred embodiments, the number m of "on" channel bits per binary pattern is chosen, the sparseness s is selected to maximize the storage capacity C, and a modulation code having the optimum sparseness s for the chosen m is used to encode the data groups for storage.

It will be clear to one skilled in the art that the above embodiments may be altered in many ways without departing from the scope of the invention. For example, in some embodiments binary patterns 40 do not have the appearance shown in FIG. 2. Binary patterns 40 have any form appropriate to the storage medium. In some embodiments, "on" channel bits 42b and "off" channel bits 42a are round, rather than rectangular. Any shape is possible for "on" channel bits 42b and "off" channel bits 42a, and binary patterns 40 may comprise any geometrical arrangement of channel bits. Accordingly, the scope of the invention should be determined by the following claims and their legal equivalents.

We claim:

1. A method of encoding binary data for storage in a holographic storage medium, said method comprising the steps of:

a) forming a series of data groups from said binary data;

b) converting said data groups into a number of binary patterns, wherein each of said binary patterns comprises channel bits, and wherein a $k^{th}$ of said binary patterns has $m_k$ "on" channel bits and $n_k-m_k$ "off" channel bits, wherein $m_k<n_k/2$; and c) storing said binary patterns as a plurality of pages in said holographic storage medium.

2. The method of claim 1, wherein a $k^{th}$ of said data groups comprises $b_k$ binary bits, and wherein $n_k$-choose-$m_k \geq 2^{b_k}$.

3. The method of claim 1, wherein for every value of k between 1 and said number of binary patterns, $m_k=m$.

4. The method of claim 3, wherein:

a) a sparseness is an average value of $n_k/m$, and b) said sparseness is selected to maximize a storage capacity of said storage medium.

5. The method of claim 4 wherein said sparseness is equal to 3.

6. The method of claim 1, wherein the step of converting said data groups into said binary patterns comprises the step of using a lookup table.

7. The method of claim 1, wherein the step of forming said series of said data groups comprises the step of error correction encoding said binary data.

8. The method of claim 1, wherein the step of forming said series of said data groups comprises the step of reordering bytes of said binary data.

9. The method of claim 1, further comprising the step of storing reference marks in said storage medium.

10. A holographic storage medium comprising:

a plurality of regions of perturbations in an index of refraction of said storage medium, wherein said regions correspond to a plurality of pages comprising binary patterns of channel bits, and wherein said binary patterns have fewer "on" channel bits than "off" channel bits; and additional regions of perturbations in said index of refraction, said additional regions corresponding to reference marks.

11. The medium of claim 10 wherein each of said binary patterns has m "on" channel bits and n–m "off" channel bits.

12. A method of decoding binary data stored as pages in a holographic storage medium, said method comprising the steps of:

a) illuminating said storage medium with an address beam;

b) detecting a plurality of light signals induced by said address beam;

c) using said detected light signals to form a data array;

d) identifying a data sector comprising n elements of said data array, wherein n>2;

e) identifying the m largest values of said n elements as "on" channel bits, wherein m is a number less than n/2; and identifying the remaining n–m values of said n elements as "off" channel bits, thereby obtaining a binary pattern corresponding to said data sector; and f) converting said binary pattern to a binary number.

13. The method of claim 12, further comprising the steps of:
   a) identifying additional data sectors of said data array, and
   b) converting said additional data sectors to additional binary patterns, wherein a $k^{th}$ of said additional binary patterns comprises $m_k$ "on" channel bits and $n_k-m_k$ "off" channel bits;

wherein an average value of $n_k/m_k$ optimizes a storage capacity of said storage medium.

14. The method of claim 12, wherein said step of converting said binary pattern to a binary number comprises the step of using a lookup table.

15. The method of claim 12, further comprising the steps of:
   a) identifying additional data sectors of said data array;
   b) converting said additional data sectors into additional binary numbers;
   c) unshuffling said binary number and said additional binary numbers, to obtain a reordered sequence of binary numbers.

16. The method of claim 15, further comprising the step of error correction decoding said reordered sequence of binary numbers.

* * * * *